United States Patent [19]
Heine

[11] 3,776,619
[45] Dec. 4, 1973

[54] OPHTHALMOSCOPE WITH INTERCONNECTED ILLUMINATION AND LENS CARRIER SYSTEMS

[75] Inventor: Helmut A. Heine, Herrsching/Obb., Germany

[73] Assignees: Propper Manufacturing Co., Inc., Long Island City, N.Y.; Optotechnik Heine KG, Herrsching Obb., Germany; part interest to each

[22] Filed: Nov. 20, 1972

[21] Appl. No.: 308,253

[30] Foreign Application Priority Data
Apr. 18, 1972 Germany.................. P 22 18 681.8

[52] U.S. Cl....................... 351/12, 351/13, 351/14, 351/16
[51] Int. Cl............................................. A61b 3/12
[58] Field of Search .................. 351/10, 11, 12, 13, 351/14, 16

[56] References Cited
UNITED STATES PATENTS
3,600,067   8/1971   Heine.................................... 351/12
1,776,960   9/1930   Turville et al. .................... 351/16 X Primary Examiner—Paul A. Sacher
Attorney—Morton Amster et al.

[57] ABSTRACT

An ophthalmoscope is provided with an illuminating system including a mask or test pattern for projection on the fundus of the eye. The focal point of the mask or test pattern is automatically adjusted in accordance with the viewing lens selected such that the focal point of the pattern corresponds to the focal length of the lens thereby insuring a sharp image of the mask or test pattern on the fundus once the proper lens has been selected.

10 Claims, 3 Drawing Figures

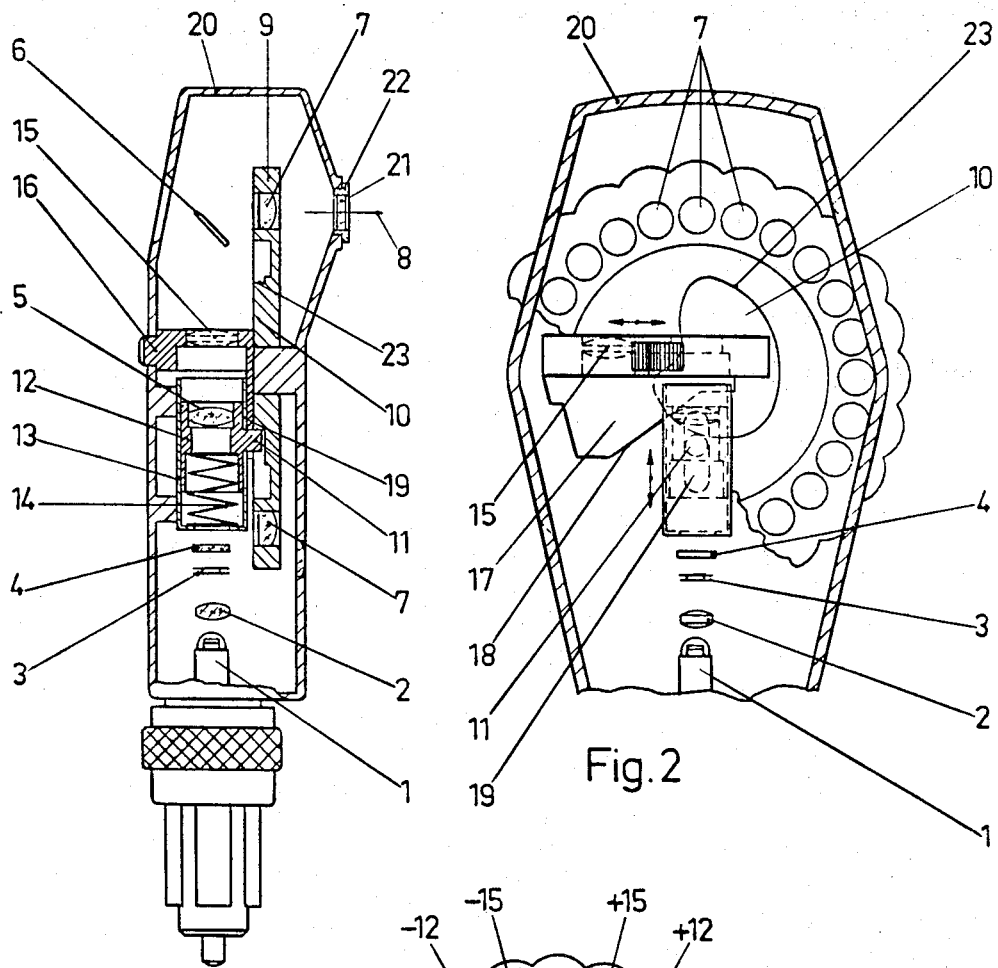

OPHTHALMOSCOPE WITH INTERCONNECTED ILLUMINATION AND LENS CARRIER SYSTEMS

The invention relates to an ophthalmoscope with a device for automatically focusing the illuminating beam at a distance corresponding to the focal length of whatever lens is inserted into the line of sight.

When the physician is examining the back of the eye, it is frequently necessary to project a sharp image of slits of light or test images onto this area. The focusing of a sharp image of a slit of light or test pattern on the back of the eye requires an adjustment of the actual or virtual focal length of the illuminating system to correspond to the refractive conditions of the eye being examined.

There are known types of ophthalmoscopes in which it is possible to achieve a focus of the illuminating device in such a way that the examiner may focus the pattern sharply on the *fundus oculi* by varying the distance between the illuminating lens and a test pattern. Such an ophthalmoscope has been described, for instance, in British Pat. No. 665,531 of Jan. 23, 1952.

The disadvantage of such devices is that the examiner must first adjust to a sharp picture of the retina by the insertion of lenses into the line of vision, and only then may he make a sharp adjustment of the image of the selected light slit or test pattern on the retina. This is not only time-consuming, but easily leads to faulty adjustments, since it is not always the simplest matter for the examiner to decide whether a fuzzy picture of the test pattern on the retina is caused by an incorrect adjustment of the focusing mechanism or by an incorrectly chosen lens in the path of vision.

The purpose of the invention is to construct the illumination system of an ophthalmoscope in such a way that the focusing of the illuminating beam takes place automatically in conjunction with a correct adjustment of the lens inserted into the line of vision, in such a way that the pattern of slits or test patterns appear sharply defined on the retina.

The invention proposes to solve this problem by providing for a variability in the distance between the lens in the illuminating system and the slit of light or test pattern and/or a variation in the focal length of the illuminating lens, and by coordinating these changes with the position of the viewing lens carrier in such a way that the distance of the real or virtual image corresponds to the focal length of the particular viewing lens in the lens carrier that is presently interposed in the path of vision. Provision may also be made so that the connection between viewing lens carrier and the illuminating system may be disengaged in such a way that after disengagement the image of the slit of light or test pattern will be at a fixed, relatively infinite distance.

FIGS. 1 and 2 show a form of embodiment of the invention, by way of example, in which the distance of the illuminating lens from the light slits or test patterns is controlled by the placement of the lens carrier, which is here embodied as a lens wheel. FIG. 3 shows a typical lens carrier.

The ophthalmoscope shown in FIG. 1 has as its light source the incandescent bulb 1, which is provided with current from a battery or cable connection not shown. The slit of light, light-shaping mask or test figure or other means for shaping the beam of light (generically referred to as light-shaping means) 3 is illuminated via the condenser 2. At a suitable position in the line of vision, color or polarizing filters 4 may be inserted.

The illuminating lens 5 forms the image of the slit or test pattern at a distance dependent on the focal length of the lens 5 and the distance of this lens from the test pattern 3. The mirror 6 is used to deflect the beam of light to the eye of the patient. On the lens carrier 9, represented here by the lens wheel, are a number of lenses 7, with focal lengths graduated in a suitable manner. By turning this lens wheel, the lens with the required focal length may be inserted into the line of vision. The viewing aperture 8 may be closed off by a flat pane of glass 21 or, instead of this, a corrective lens. This glass pane or corrective lens is secured to the housing 20 of the ophthalmoscope by the fastener 22.

Whereas FIG. 1 shows a cross section through the ophthalmoscope, FIG. 2 shows the same ophthalmoscope from the side facing away from the examiner, with the housing open.

The cam plate 10 is permanently attached to the lens wheel 9. It is preferable for the lens wheel and the cam to be made of a single piece, such as by a plastic molding process.

The lens 5 is secured inside a lens fastener 12, which is located so as to be axially displaceable inside a guide socket. The guide pin 11, which is connected with the lens fastener, is free to slide inside a slot 19 of the guide socket. A spring 14 presses the lens fastener against the edge 23 of the cam 10.

When the lens wheel 9 is rotated to select the lens for insertion into the line of sight, so that the examiner sees a sharp image of the patient's fundus, then the illuminating lens 5 is brought across the pin 11, by means of the cam 10, into a predetermined interval from the slit or test pattern 3.

The curved edge of the cam 10 is shaped in such a way that the image of the test pattern created by the illuminating lens 5 is at a distance corresponding to the focal length of the lens 7 which has just been inserted into the line of vision.

Thus, if the lens selected has a refracting power of +2 diopters, and this is inserted into the line of vision so as to obtain a sharp image of the patient's fundus, then an actual image of the slit or test pattern will occur at a distance of 50 cm. If in another case a lens with −4 diopters must be inserted in order to achieve a sharp picture of the fundus oculi, then a virtual image of the slit or test pattern will appear at a distance of 25 cm.

Thus, as soon as the examiner has adjusted to the correct lens in the lens wheel, or in other words has reached a situation in which he sees a sharp image of the patient's fundus oculi, then the slit or test pattern 3 will be projected as a sharply focused image on the back of the patient's eye.

If the examiner's eye is not emmetropic, then in order to obtain a sharply focused view of the patient's fundus oculi, he must move the lens wheel until he has interposed into the line of vision a lens which not only makes provision for a defective refraction on the part of the patient but also for that of his own eye. If this refractive defect of the oculist is considerable, then it may no longer be assumed that the image of the slit or test pattern is sharply focused on the patient's fundus oculi when the physician sees it sharply focused at that point.

In order to make it possible for physicians with more serious refractive defects and related astigmatism to use the ophthalmoscope related to the invention, provision has been made in such cases to replace the flat pane 21, which is held inside the viewing aperture of the housing 20 by means of the bracket 22, with a lens that corrects the refractive defect of the oculist. This is especially advantageous, since it is generally desirable to use the ophthalmoscope without eyeglasses, so that the ophthalmoscope is as close as possible to the eye of the examiner, since this will insure a full view of as much as possible of the field of vision.

Since in some cases it might be desirable to perform without the use of automatic focusing, the invention is provided, in the form of embodiment represented, with a device that is used to disconnect the relationship between the setting of the lens wheel and the focusing of the illuminating beam of light The slide 16, which is brought into the corresponding slit in the housing 20, has an extension 17 with a guiding surface 18. If this slide is moved to the right in the situation pictured in FIG. 2, then the guiding surface 18 will compress the pin 11 to its lowest position. In this position, the pin 11 moves in complete independence of the cam 10, for every adjustment of the lens wheel 9. When the lens 5 is in the lowest position, i.e., in that position in which its distance from the slit or test pattern 3 is smallest, then a virtual image of the test pattern will be formed, since the test pattern lies inside the focal length of the lens, on the side toward the lens.

But it is generally desirable, when working without the automatic focus, to have the slit or test pattern at an infinite distance. In order to achieve this, the slide 16 is provided with an auxiliary lens 15, which is inserted into the line of illumination when the slide, again referring to FIG. 2, is pushed to the right, i.e., if it is operated without automatic focus. The auxiliary lens 15 is of such a size that it forms, together with the illuminating lens 5, in its lowest position as determined by the guiding surface 18 of the slide 17, an image of the slit or test pattern at infinity.

The slit or test pattern 3 is represented schematically in the drawings. As is well known, it is possible for various slits and test patterns to be provided, these being arranged on a wheel with several adjustable positions, for instance. Thus it is possible, by way of example, to have a selection of star-shaped figures for testing extrafoveal fixation, graduations in the form of polar coordinate systems or cartesian coordinate systems, etc.

FIG. 3 shows a lens wheel from the point of view of the examiner. Beginning with an unobstructed view, corresponding to a refractive power of 0 diopters, a suitable gradation of lenses is arranged, with plus values on one side and negative values on the other. In known examples of this type of lens wheel, the plus and minus values of the highest magnitude approach the values of ±20 diopters in the example shown. Provision has been made to place a pane of colored glass or colored transparent plastic between the lenses with these maximum values. In this way, the examiner will know immediately that the plus or minus values have reached their peak and that there are no higher plus or minus values available with the turning of the wheel. At the same time, the adoption of this measure means that the cam 10 will have to curve too steeply at the point of transition between high plus values and high minus values, since when the lens wheel 9 is turned through a relatively small angle, the illuminating lens 5 must be brought from its maximum to its minimum position, or the reverse; so that a relatively higher torque must be applied in order to continue moving the lens wheel from the highest minus value to the highest plus value. This disadvantage is avoided by using the design relating to the invention.

The advantage of ophthalmoscopes developed in accordance with the invention is that the illuminating beam is automatically focused in such a way that the examiner sees a sharp image of the slit or test pattern projected by the illuminating device onto the fundus oculi, if he is also seeing a sharp image of the fundus oculi with the aid of the lenses inserted into the line of vision.

What is claimed is:

1. An ophthalmoscope comprising a viewing optical system having a viewing axis and including a lens carrier supporting a plurality of lenses of different power, said lens carrier being adjustable for sequentially inserting said plurality of lenses one at a time into the viewing axis of said instrument, an illuminating system for projecting a beam of light into the eye for illuminating the internal surface of the eye under observation, said illuminating system including means for shaping said beam of light said shape being projected onto said internal surface, means for adjusting the focal length of said illuminating system for controlling the point at which the image of said shape or test pattern appears to be focused, and means for interconnecting said lens carrier in said viewing optical system and said adjusting means in said illuminating system such that selection of one of said plurality of lenses automatically adjusts the focal length of said illuminating system so that the image of the test pattern appears focused on said internal surface.

2. Apparatus in accordance with claim 1 wherein said illuminating system includes a condensing lens and wherein said illuminating system is adjusted by varying the distance between said condensing lens and said shape forming means.

3. Apparatus in accordance with claim 1 including means for disabling said connecting means between said lens carrier in said viewing optical system and said adjusting means in said illuminating optical system, said disabling means simultaneously adjusting said illuminating optical system so that the image of said test pattern is projected at a selected fixed distance.

4. Apparatus in accordance with claim 3 wherein said selected fixed distance is infinity.

5. Apparatus in accordance with claim 1 wherein the viewing aperture of the ophthalmoscope is closed off by a glass window held in place by a removable bracket such that said window may be removed and replaced by a lens suited to the particular refractive needs of the individual user.

6. An ophthalmoscope including a viewing axis a lens wheel carrying a plurality of lenses of different powers for viewing an internal surface of an eye, said wheel being rotatable so that said plurality of lenses may be positioned in the viewing axis of said instrument one at a time; an illuminating system including a source of light, light-shaping means, and an illuminating system lens for creating an image of said light light-shaping means on said internal surface of said eye at least one of said illuminating system lens and said light-shaping means being mounted for axial movement within said ophthalmoscope; a cam follower associated with said movably mounting such that movement of said cam follower controls the separation between said illuminating system lens and said light mask or test pattern; a cam surface on said lens wheel, said cam follower engaging said cam surface such that rotation of said lens wheel to select a desired lens adjusts the separation between said illuminating system lens and said light shaping means thereby adjusting the focal point of said light shaping means in said illuminating system in accordance with the focal length of said selected lens.

7. Apparatus in accordance with claim 6 further including control means operable by the user of said ophthalmoscope for engaging said cam follower and establishing a fixed relation between said illuminating system lens and said light shaping means such that the focal point of said light shaping means in said illuminating system is fixed independent of the position of said lens wheel.

8. Apparatus in accordance with claim 7 wherein said control means further includes a second illuminating system lens which is interposed in said illuminating path when said slide means engages said cam follower such that the image of said light-shaping means is focused at infinity.

9. Apparatus in accordance with claim 8 further including indicator means between the two lenses of the lens wheel with the highest positive and negative powers of refraction.

10. Apparatus in accordance with claim 6 wherein the viewing aperture of the ophthalmoscope is closed off by a glass window held in place by a removable bracket such that said window may be removed and replaced by a lens suited to the particular refractive needs of the individual user.

* * * * *